United States Patent [19]

Strauss et al.

[11] 4,054,561
[45] Oct. 18, 1977

[54] THERMOPLASTIC ADDITIVES FOR MOLDING COMPOUNDS

[75] Inventors: Carl R. Strauss, Newark; Michael G. Roberts, Heath; Charles E. Bolen, Newark, all of Ohio

[73] Assignee: Owens-Corning Fiberglas Corporation, Toledo, Ohio

[21] Appl. No.: 775,148

[22] Filed: Mar. 7, 1977

Related U.S. Application Data

[63] Continuation of Ser. No. 544,455, Jan. 27, 1975, abandoned.

[51] Int. Cl.² .................. C08L 67/02; C08L 67/08
[52] U.S. Cl. .................... 260/22 D; 260/22 CB; 260/40 R; 260/860; 260/861
[58] Field of Search .................. 260/22 D, 860, 861, 260/22 CB, 485 P, 485 G

[56] References Cited

U.S. PATENT DOCUMENTS

| 3,257,335 | 6/1966 | Whitfield et al. | 260/2.3 |
|---|---|---|---|
| 3,344,091 | 9/1967 | Russin et al. | 260/2.3 |
| 3,406,134 | 10/1968 | Seiwert et al. | 260/22 D |
| 3,427,267 | 2/1969 | Stieger et al. | 260/22 CB |
| 3,496,220 | 2/1970 | McCarty et al. | 260/475 P |
| 3,506,622 | 4/1970 | Higgins | 260/75 R |
| 3,673,132 | 6/1972 | Parker et al. | 260/22 D |
| 3,689,461 | 9/1972 | Balint et al. | 260/75 M |
| 3,701,748 | 10/1972 | Kroekel | 264/331 |
| 3,801,532 | 4/1974 | Olstowski | 260/18 TN |
| 3,823,219 | 7/1974 | Ward et al. | 264/331 |
| 3,824,201 | 7/1974 | McGranaghan et al. | 260/18 TN |
| 3,867,349 | 2/1975 | Heeg et al. | 260/75 M |
| 3,882,189 | 5/1975 | Hudak | 260/18 TN |
| 3,884,850 | 5/1975 | Ostrowski | 260/2.3 |

Primary Examiner—Ronald W. Griffin
Attorney, Agent, or Firm—Philip R. Cloutier; Ronald C. Hudgens; Dennis M. Kozak

[57] ABSTRACT

Thermoplastic additives comprising the esterification product of a mixture of glycols and oligomers with dimer and trimer acids are blended with thermosetting resins to reduce the shrinkage of the latter on molding.

12 Claims, No Drawings

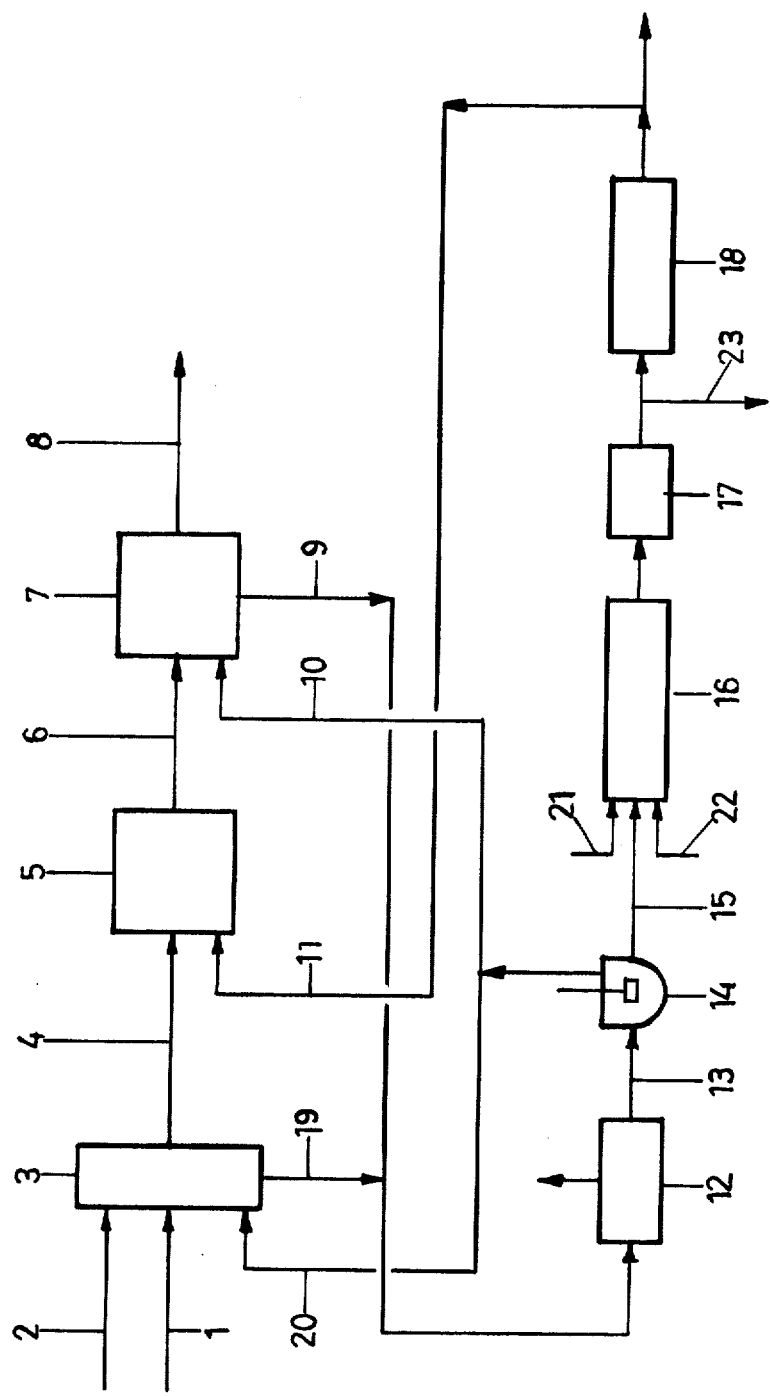

PROCESS FOR THE MANUFACTURE OF LACTAMS

CROSS-REFERENCE TO RELATED APPLICATION

A process for manufacturing lactams in which ammonium sulfate is converted to sulfuric acid for recycling is described in copending U.S. Pat. application Ser. No. 261,220 filed June 9, 1972.

DESCRIPTION OF THE INVENTION

1. Field of the Invention

This invention relates to a process for manufacturing lactams from cycloalkanone-oximes.

2. Description of the Prior Art

Several processes are known by which lactams may be prepared from cycloalkanone-oximes. The cycloalkanone-oximes can be prepared by a process which involves reacting a cycloalkanone with hydroxylamine sulfate solution and neutralizing the sulfuric acid thusly liberated with ammonia. In general, the manufacture of lactams involves a ring expansion via Beckmann rearrangement of cyclic ketoximes. Several basic processes for manufacturing lactams are known, including the hydrogenation of phenol to cyclohexanole and dehydrogenation of cyclohexanole to cyclohexanone and reaction of the cyclohexanone with hydroxylamine sulfate solution to form cyclohexanone oxime, followed by Beckmann arrangement with sulfuric acid; the catalytic oxidation of cyclohexane to cyclohexanone, followed by reaction with hydroxylamine sulfate solution to form cyclohexanone oxime, and then Beckmann rearrangement by sulfuric acid; and the light catalyzed reaction of cyclohexane with nitrosyl chloride to cyclohexanone oxime hydrochloride, following by a Beckmann rearrangement. These processes, described with particular reference to the manufacture of caprolactam, are also applicable to the manufacture of other lactams.

The manufacture of lactams by a process which includes neutralizing a reaction mixture containing sulfuric acid with ammonia to form ammonia sulfate, such as the manufacture of $\epsilon$-caprolactam via cyclohexanone-oxime, is coupled with the unavoidable production of about 1 to 4 tons ammonium sulfate per ton of caprolactam, depending on the particular process used. The ammonium sulfate has an unfavorable effect on the economics of manufacturing the lactam since there is very little demand for this by-product. Using the ammonium sulfate directly as a fertilizer is not feasible because the impurities it contains result in a colored product which crystallizes poorly.

Accordingly, the prior art has proposed various techniques to improve the economics of lactam production. It is known, before crystallization, to subject the ammonium sulfate solution arising in the manufacture of caprolactam to a heat treatment under pressure in order to manufacture a fertilizer (German Published Specification No. 1,284,954) or to treat the solution with aluminum sulfate and the sodium salt of ethylenediaminetetraacetic acid (Italian Pat. Specification No. 678,180). Ammonium sulfate solutions from the manufacture of caprolactam, which are rich in organic constituents, can, according to Netherlands Pat. application Nos. 65-16,058 and 65-16,059, be evaporated and thereby separated from the organic constituents, and then crystallized. While these and other prior art measures improve the quality of the ammonium sulfate produced, they are not economically satisfactory because the demand for ammonium sulfate as a fertilizer is very restricted.

From the teachings of German Published Specification 1,916,149 it is possible to neutralize the rearrangement reaction mixture obtained in lactam manufacture with calcium oxide, magnesium oxide, zinc oxide or copper oxide instead of ammonia, and to split the resultant metal sulfates under reductive conditions to form the metal oxides and sulfur dioxide. The metal oxide is reused for neutralization, and the sulfur dioxide converted into sulfuric acid which is employed in the rearrangement reaction. This process suffers from the disadvantages that neutralization with metal oxides takes place more slowly than with the more extensively used ammonia, and that contamination of the metal oxide recycled to the neutralization occasioned by the reductive splitting of the sulfate is frequently unavoidable.

It is known from U.S. Pat. No. 3,383,170 that ammonia can be liberated from ammonium sulfate at 200°-450° C, leaving ammonium bisulfate as a residue. The thus-obtained ammonium bisulfate can then be converted into sulfur dioxide and ammonium sulfate by reduction with sulfur, hydrogen sulfide or hydrogen at about 400°-550° C. Although almost all the ammonia is recovered in this process, it is necessary to employ for the reduction either relatively expensive hydrogen, or, when using sulfur or hydrogen sulfide as the reducing agent, a greater amount of sulfuric acid must be produced than can be recycled into the preceding process stage yielding ammonium sulfate. The amount of ammonium sulfate unavoidably produced would then only be replaced by an excess production of sulfuric acid, which frequently is undesirable.

U.S. Pat. No. 3,359,069 and German Pat. Nos. 1,199,243 and 1,206,404 describe the thermal decomposition of a waste liquor comprising sulfuric acid containing ammonium salts such as ammonium sulfate at temperatures of about 900° C. In this process, the ammonium ion dissolved in the acid is essentially converted to nitrogen and water, so that an $SO_2$-containing gas is produced which is practically free of nitrogen oxide. This process is suitable, for example, for the combustion of waste liquors such as the residual sulfuric acids obtained in the manufacture of acrylates which contain organic as well as inorganic ammonium salts.

The-cross referenced U.S. patent application describes a lactam manufacturing process wherein solid, finely divided ammonium sulfate is burned at temperatures of between 850° and 1250° C together with a carbon-containing fuel to form sulfur dioxide, steam, and nitrogen. In this process, there is a loss of ammonia due to combustion, so this process is particularly applicable where primary importance is placed on the recovery of the sulfur content of the ammonium sulfate.

OBJECTS OF THE INVENTION

Accordingly, it is an object of this invention to provide a process for the manufacture of lactams which internally utilizes ammonium sulfate by-product.

Another object of this invention is to provide a process for the manufacture of cycloalkanone-oximes which eliminates the build-up of ammonium sulfate by-product.

A further object of this invention is to provide a process for the manufacture of lactams wherein a portion of ammonia used to neutralize sulfuric acid is internally generated.

An additional object of this invention is to provide a process for the manufacture of alkanone-oximes wherein a portion of ammonia used to neutralize the rearrangement mixture is internally generated.

A more specific object of this invention is to provide a process for the production of ε-caprolactam.

Upon further study of the specification and appended claims, further objects and advantages of this invention will become apparent.

SUMMARY OF THE INVENTION

This invention provides, in a process for manufacturing a lactam which includes rearranging a cycloalkanone-oxime with sulfuric acid to form the lactam, neutralizing the rearrangement mixture with ammonia to form ammonium sulfate, and separating the lactam and the ammonium sulfate, the improvement which comprises:

a. heating at least a portion of the ammonium sulfate to a temperature of 240°–460° C to form ammonia and ammonium bisulfate;
b. separating the ammonia from said ammonium bisulfate;
c. recycling the ammonia to neutralize the rearrangement mixture;
d. burning the ammonium bisulfate at a temperature of 850°–1250° C to form an $SO_2$-containing gas;
e. oxidizing the $SO_2$-containing gas to form sulfuric acid; and
f. recycling the sulfuric acid to the rearrangement stage.

BRIEF DESCRIPTION OF THE DRAWING

The above and other objects of the invention will become more fully apparent to those skilled in the art from the following detailed discussion, taken with the annexed drawing, which schematically illustrates a plant suitable for carrying out the process of this invention.

DETAILED DISCUSSION

The invention provides a process for the manufacture of lactams from cycloalkanone-oximes by rearrangement with sulfuric acid or oleum, neutralization of the mixture from the rearrangement reaction with ammonia and separation of the lactam from the ammonium sulfate formed, in which the ammonium sulfate is incorporated into the process of lactam manufacture so that there is no longer a problem of purification or sale of this by-product. The economics of lactam production are greatly improved by recovering the sulfuric acid required for the Beckmann rearrangement from the ammonium sulfate which is formed.

This is achieved, according to the invention, by splitting ammonia from the ammonium sulfate produced during the neutralization of sulfuric acid with ammonia, by heating the ammonium sulfate to a temperature of between 240° and 460° C to split ammonium sulfate into ammonia and ammonium bisulfate. The ammonia thusly-formed is used in the neutralization of the rearrangement mixture and/or of the sulfuric acid liberated during the oximation stage. The sulfate melt formed during the splitting off of ammonia is burned at temperatures between 850° and 1250° C, to form a gas containing $SO_2$. The gas containing $SO_2$ is reacted in a known manner, e.g., by contact oxidation at temperatures between 400° and 600° C and absorption, to give sulfuric acid or oleum, and the sulfuric acid or the oleum is recycled to the rearrangement stage. In this way, up to 50% of the ammonia contained in the ammonium sulfate can be recovered and re-employed in the neutralization of the rearrangement mixture and/or of the oximation mixture, and the amount of ammonia required from external sources for the entire process is substantially reduced as compared to the known processes wherein ammonium sulfate issues as a by-product.

In most processes for the manufacture of lactams, the ammonium sulfate is obtained as an aqueous solution having a concentration of between 35 and 46 weight percent $(NH_4)_2SO_4$. This solution is preferably concentrated by partial or complete evaporation before splitting off ammonia, whereupon solid ammonium sulfate crystallizes out. In the case of the partial evaporation, the mother liquor which remains is recycled to the neutralization stage.

The ammonium sulfate which crystallizes out is subsequently split at least partially into ammonia and ammonium bisulfate. The splitting is preferably carried out in the temperature range of 270° to 360° C under atmospheric pressure, in the presence of an excess of ammonium bisulfate, e.g., from 10 to 100 times the molar amount of the sulfate. The ammonium sulfate to be split is mixed with a vigorously agitated, preferably stirred, ammonium bisulfate melt containing 1.1 to 10.3 weight percent ammonium sulfate, at a temperature within the indicated range, whereupon $NH_3$ is evolved. The steady state molar ratio of ammonium sulfate to bisulfate in a continuous process is generally about 0.01 to 0.1, preferably about 0.02 to 0.085. The $NH_3$ formation can be accelerated by an entraining agent, for example steam or nitrogen. For the maximum splitting off of $NH_3$, it is preferred to conduct same in a column into which the ammonium bisulfate melt, laden with ammonium sulfate, is introduced. The entraining agent flows upwardly in the column and entrains the split-off ammonia overhead. Splitting can be carried out either in one stage, e.g., in a stirred kettle, or in two stages, e.g., a stirred kettle with a subsequent column. In the two-stage procedure, only a portion of the ammonia which can be split off is obtained in the first stage, generally 10 to 60 weight percent and preferably 20 to 40 weight percent of the recoverable ammonia. In order to separate off further $NH_3$, the ammonium bisulfate melt laden with ammonium sulfate is charged into a column through which the stripping agent flows upwards and carries off further ammonia at the head. Though it would appear theoretically desirable to split off as much $NH_3$ as possible and to feed an ammonium bisulfate which contains as little ammonium sulfate as possible to the subsequent combustion furnace, it has been found preferable to burn ammonium bisulfate containing ammonium sulfate since the work required to remove all of the ammonia is greatly out of proportion to the additional amount of ammonia obtained. Furthermore, temperatures above 360° C, in addition to giving an increased separation of $NH_3$, result in an incipient transition of $SO_3$ into the gas phase, which transition greatly increases with increasing temperatures. The ammonium sulfate content of the $(NH_4)_2SO_4/(NH_4)HSO_4$ melt which is to be burnt is preferably 20–40 mol %, e.g., at about 30 mol %.

In the combustion of the ammonium bisulfate melt, which can also contain up to 50 mol % ammonium sulfate, according to this invention, the ammonium is oxidized to nitrogen, and steam without nitric oxides being formed in an objectionable concentration during combustion. The sulfur of the sulfate is at the same time reduced to sulfur dioxide so that a combustion gas containing sulfur dioxide is obtained. The combustion of the sulfate melt is carried out by means of a carbonaceous fuel, e.g., heavy oil or natural gas, which can also contain sulfur. Of course, it is also possible conjointly to burn hydrogen sulfide or sulfur if there is a requirement for sulfuric acid outside the production of the caprolactam. The combustion gas, which contains, for example, 5 to 7% by volume of $SO_2$, is reacted in e.g., a multi-stage contact plant, using a catalyst containing $V_2O_5$ and cooling the reaction gas between the contact stages, to give $SO_3$, and the latter is then absorbed to form sulfuric acid or oleum. The sulfuric acid or the oleum is recycled to the rearrangement stage of the manufacture of the lactam and provides the entire sulfuric acid or oleum requirement of the process.

According to a particularly preferred embodiment of the process of this invention, the ammonium bisulfate, which can also still contain ammonium sulfate, is burnt with a carbonaceous fuel, e.g., heavy oil or natural gas, or with sulfur or hydrogen sulfide. The liquid sulfate melt is preferably injected into the combustion chamber at a temperature of between 950°-1150° C. In this temperature range, combustion proceeds in such a manner that neither ammonia nor nitrogen oxides occur in the combustion gas in a pronounced quantity, i.e., generally less than 200 ppm. ammonia and less than 40 ppm. nitrogen oxides are produced. Preferably, an $O_2$ concentration of between 1 and 8% by volume inclusive, especially 1.0 to 4.5% by volume inclusive, is maintained in the gases discharged from the combustion chamber, corresponding to from 1.13 to 3.61 times the stoichiometric amount of oxygen required for complete fuel combustion within the combustion chamber. By operating in this manner, the necessity of purifying sulfuric acid or oleum before recycling it to the Beckmann rearrangement is avoided. If these conditions are not observed and a sulfuric acid containing NO is produced, the acid can be purified, before recycling to the rearrangement stage, by heating with a little $(NH_4)_2SO_4$, amidosulfonic acid or $(NH_2)_2CO$.

If ammonium sulfate which arises in the oxime-forming stage is co-processed in accordance with the invention, an appropriate proportion of the combustion gas containing $SO_2$, e.g., 15 to 40 vol. % of a gas containing 5 - 7 vol. % $SO_2$, is available for the manufacture of hydroxylamine sulfate $[(NH_2OH)_2-H_2SO_4]$.

One suitable technique for preparing hydroxylamine sulfate is the classical Raschig process, described in Kirk-Othmer, Vol. 7 (1951), page 766, paragraph 4.

Briefly, the classical Raschig process involves the reduction of sodium nitrite with soldium bisulfite and sulfur dioxide to give sodium hydroxylamine-N, N-disulfonate, followed by hydrolysis of the hot solution to give hydroxylammonium acid sulfate.

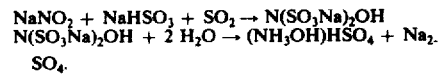

The modified Raschig process using ammonium salts as mentioned above instead of sodium salts requires also sulfur dioxide. The modern process of preparing hydroxylamine sulfate by catalytic hydrogenation of nitrogen oxide has need of sulfuric acid. Our process allows to make available the sulfur component for all of these processes.

The amount of sulfur dioxide formed by the combustion of ammonium sulfate will vary under otherwise identical conditions with the amount of sulfur burned in the fuel. Preferably the fuel will contain at least 0.1 to 0.5 weight percent sulfur in order to form sufficient $SO_2$ during combustion to make up for losses elsewhere in the system. When all of the $SO_2$ is converted directly to sulfuric acid or oleum, from 60 to 100 weight percent of this sulfuric acid is recycled to the Beckmann rearrangement stage, and 0 to 40 weight percent of this sulfuric acid can be drawn off as a by-product. If the combustion fuel is low in sulfur, e.g., contains below 0.1 weight percent sulfur, it will generally be desirable to recycle the total sulfuric acid output to the Beckmann rearrangement stage.

When a portion of the $SO_2$-containing gas is used in the manufacture of hydroxylamine sulfate, generally about 15 to 40 mol. %, of this gas, e.g., having an $SO_2$ content of 5-7 mol. %, is fed to the hydroxylamine plant, and the remaining 60 to 85 mol % is fed to a sulfuric acid plant. Of course, the yield of sulfuric acid based on $SO_2$ in the combustion gas is reduced by feeding only a portion of the $SO_2$-containing gas to the sulfuric acid plant, and a slightly higher sulfur content in the combustion fuel, e.g., at least 0.5 to 2.0 weight percent sulfur, will generally be required to produce an excess of sulfuric acid beyond that required for the Beckmann rearrangement step.

Preferably, ammonium sulfate which arises during the oximation of cyclohexane and/or during the rearrangement of cyclohexanone-oxime is used in accordance with the process of the invention. The process of the invention is applicable to all caprolactam manufacturing processes which involve the Beckmann rearrangement of cyclohexanone-oxime, that is to say also the photochemical formation of oxime from cyclohexane and nitrosyl chloride, and to the manufacture of other lactams, such as, for example, capryllactam and lauryllactam via the corresponding oximes.

The present invention further provides that the heat of the gas produced during the combustion is utilized in a heat exchanger, especially a waste heat boiler, in the course of which the gas cools to between 260° and 420° C. The steam generated in the waste heat boiler can be utilized for the evaporation of the ammonium sulfate solution and/or for melting the oxime. It is also possible to pre-warm the feed air and the combustion air by means of the waste heat.

Referring now to the drawing, cyclohexanone arriving through pipeline 2 and hydroxylamine sulfate supplied through pipeline 1 are reacted in the oximation reactor 3, and the liberated sulfuric acid is neutralized with ammonia. The oxime is separated from the resultant ammonium sulfate solution and is passed through pipeline 4 to a rearrangement reactor 5. In reactor 5, the cyclohexanone-oxime is rearranged to ε-caprolactam at about 120° C, by means of concentrated sulfuric acid fed through pipeline 11. The mixture from the rearrangement reaction passes through pipeline 6 into a neutralization reactor 7, where it is neutralized with gaseous ammonia recycled through pipeline 10. In a conventional separation apparatus (not shown), the mixture is separated into ammonium sulfate solution and ε-caprolactam which flows through pipeline 8 into a purification plant (not shown). The ammonium sulfate solution which forms during neutralization is passed through pipeline 9, together with the ammonium sulfate solution coming through pipeline 19 from the oximation stage, to evaporator 12 in which the ammonium sulfate crystallizes out.

The solid ammonium sulfate is introduced through pipeline 13 into stirred vessel 14 and is there mixed with an excess of melt consisting of e.g. 97 parts by weight of ammonium bisulfate and 3 parts by weight ammonium sulfate. Here, ammonia is split off from the ammonium sulfate and is recycled via pipeline 20 to the oximation reactor 3.

The fused ammonium bisulfate, which contains 2.6 mol. % dissolved ammonium sulfate, is injected through pipeline 15 into the furnace 16 and is burnt with air from line 21 and a sulfur-containing fuel oil from line 22. The combustion gas containing $SO_2$ leaves the furnace 16 at about 1100° C and transfers its heat to the subsequent waste heat boiler 17, cooling the gas to about 400° C. Thereafter, following conventional purification and drying (not shown) the gas is fed to a contact plant 18 for the production of sulfuric acid. The concentrated sulfuric acid produced therein returns through pipeline 11 to the rearrangement stage of the manufacture of caprolactam.

Behind the waste heat boiler 17, gas containing $SO_2$ is branched off at 23 and passed to the hydroxylamine sulfate plant (not shown). If sulfur or hydrogen sulfide is additionally burnt in the furnace 16, and/or a fuel of sufficient S-content is burnt in the furnace 16, the entire $SO_2$ consumption of the hydroxylamine plant can be covered.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 8.63 Parts by weight of hydroxylamine sulfate in aqueous solution is reacted with 10.6 parts by weight of cyclohexanone at 40° to 50°C, with vigorous stirring, to give 10.98 parts by weight of cyclohexanone-oxime. During the reaction, 5.95 parts by weight of 30% aqueous ammonia is introduced into the mixture with cooling. After removing the cyclohexanone-oxime, a concentrated aqueous ammonium sulfate solution remains which contains 6.92 parts by weight of $(NH_4)_2SO_4$.

The 10.98 parts by weight of cyclohexanone-oxime are rearranged by means of 14.3 parts by weight of 100% strength sulfuric acid at about 110° to 120° C, with stirring and intense cooling, to give ε-caprolactam. The mixture from the rearrangement is then transferred into a neutralization vessel and neutralized with 4.96 parts by weight of ammonia at 40° to 50° C. After separating the caprolactam layer from the aqueous ammonium sulfate solution, purification yields 10.35 parts by weight of ε-caprolactam.

The 19.26 parts by weight of ammonium sulfate obtained in the neutralization stage, as an almost saturated aqueous solution, is combined with the 6.92 parts of ammonium sulfate from the oximation stage and evaporated to yield 25.82 parts by weight of solid crystaline ammonium sulfate. This solid ammonium sulfate is subsequently split in a stirred kettle at about 355° C, in the presence of 5000 parts by weight of ammonium bisulfate, into 2.32 parts by weight of ammonia and 23.5 parts by weight of an ammonium bisulfate melt containing appr. 2.6 mol. % ammonium sulfate. The ammonia evolved is returned to the rearrangement reaction for use as a neutralizing agent.

The ammonium bisulfate melt containing $(NH_4)_2SO_4$, which issues in a liquid form from the splitting-off stage, is heated with 3.48 parts by weight of heavy oil having a calorific value of 10,000 kcal/kg, whereby 69 parts by volume of combustion gas at 1,040° C, containing 6.1% by volume of $SO_2$ and 0.3% by volume of $SO_3$, are produced. The furnace is coupled to a waste heat boiler, in which about 1.12 tons of steam (55 atmospheres gauge) is generated per ton of $(NH_4)_2SO_4$ to be processed. 16.5 parts by volume of the gas containing $SO_1$ is returned, after cooling and drying, to the manufacture of hydroxylamine sulfate. The remaining 52.5 parts by volume of the gas is oxidized to $SO_3$ in a three-stage contact plant and converted into concentrated sulfuric acid. 14.3 parts by weight of $H_2SO_4$ are produced, which is re-employed in the rearrangement reaction of the cyclohexanoneoxime The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions. For example, this process can be utilized in a method of manufacturing $SO_2$ from sulfuric acid which comprises neutralizing sulfuric acid with ammonia to form ammonium sulfate, heating at least a portion of the ammonium sulfate to a temperature of 240°-460° C to form ammonia and ammonium bisulfate, separating the ammonia from the ammonium bisulfate, recycling the ammonia to neutralize the rearrangement mixture, and burning the ammonium bisulfate at a temperarture of 850°-1250° C to form an $SO_2$-containing gas.

What is claimed is:

1. In a process for manufacturing a lactam which includes rearranging a cycloalkanone-oxime with sulfuric acid or oleum to form said lactam, neutralizing the rearrangement mixture with ammonia to form ammonium sulfate, and separating said lactam and said ammonium sulfate, the improvement which comprises:
   a. heating at least a portion of said ammonium sulfate to a temperature of 240°-460° C in the presence of a molar excess of ammonium bisulfate to form a reaction mixture consisting essentially of gaseous ammonia and an ammonium bisulfate melt;
   b. separating said gaseous ammonia from said ammonium bisulfate melt;
   c. recycling said gaseous ammonia to neutralize said rearrangement mixture;
   d. burning said ammonium busulfate melt at a temperature of 850°-1250° C to form an $SO_2$-containing gas;
   e. oxidizing said $SO_2$-containing gas to form sulfuric acid or oleum; and
   f. recycling 60-100% of said sulfuric acid or oleum to the rearrangement stage.

2. A process according to claim 1, wherein said ammonium sulfate is burnt by combustion of a carbonaceous fuel.

3. A process according to claim 1, wherein said ammonium sulfate is burnt by combustion of a sulfur-containing fuel.

4. A process according to claim 1, wherein said ammonium sulfate is obtained as an aqueous solution which is concentrated by evaporation prior to said heating step.

5. A process according to claim 1, wherein said ammonium bisulfate is injected into a combustion chamber.

6. A process according to claim 1, wherein said ammonium bisulfate is burnt containing 20–40 mol % ammonium sulfate.

7. A process according to claim 1, wherein the ammonium sulfate content is about 30 mol %.

8. A process according to claim 1, wherein said lactam is ε-caprolactam.

9. A process according to claim 1, wherein the heat of the gas produced in the combustion stage is heat exchanged with the ammonium sulfate.

10. A process according to claim 1, wherein the heat of the gas produced in the combustion stage is heat exchanged to evaporate ammonium sulfate solution.

11. A process according to claim 1, wherein the heat of the gas produced in the combustion stage is heat exchanged to fuse said oxime.

12. A process according to claim 1, wherein the portion of sulfuric acid recycled is sufficient to provide substantially all of the sulfuric acid required for the rearrangement step.

13. A process according to claim 1, further including feeding at least a portion of said $SO_2$-containing gas to a process for the manufacture of hydroxylamine sulfate, and reacting resultant hydroxylamine sulfate with cycloalkanone to form said cycloalkanone-oxime and additional ammonium sulfate.

14. A process according to claim 13, further including recovering ammonium sulfate from said process and adding said ammonium sulfate to the ammonium sulfate obtained in the lactam manufacturing process.

15. A process according to claim 13, wherein the portion of $SO_2$-containing gas is sufficient to provide substantially all of the $SO_2$ required for the production of said hydroxylamine sulfate.

16. A process according to claim 1, wherein the ammonium sulfate is heated to a temperature of 270°–360° C.

17. A process according to claim 1, wherein the ammonium sulfate is burnt at a temperature of 950°–1150° C and an oxygen concentration of from 1 to 8% by volume is maintained in the gases leaving the combustion chamber.

18. A process according to claim 1, comprising:
a. heating at least a portion of said ammonium sulfate to a temperature of 270° – 360° C in the presence of a 10 to 100 fold molar excess of ammonium bisulfate to form ammonia and an ammonium bisulfate melt;
b. introducing said ammonium bisulfate melt laden with ammonium sulfate into a column, and passing an entraining agent upwardly therethrough to separate the split-off ammonia overhead;
c. recycling said ammonia to neutralize said rearrangement mixture;
d. burning the ammonium bisulfate melt containing up to 50 mol % ammonium sulfate by injecting said melt into a combustion chamber at a temperature of 950° – 1150° C and maintaining an oxygen concentration of 1 – 8% by volume in the gas leaving the combustion chamber to form an effluent gas consisting essentially of nitrogen, steam and sulfur dioxide and containing less than about 200 parts per million ammonia;
e. heat exchanging said effluent gas to evaporate ammonium sulfate solution or to fuse the oxime by cooling said gas to a temperature of 260° – 420° C; and
f. recycling 60 – 100% of said sulfuric acid to the rearrangement stage.

* * * * *